May 28, 1940.  W. P. HILLIARD ET AL  2,202,583
RADIO DIRECTION FINDER
Filed July 1, 1938   3 Sheets-Sheet 1

INVENTORS
WILLIAM P. HILLIARD
BY REED R. BRUNNER
F. Bascom Smith
ATTORNEY

May 28, 1940.  W. P. HILLIARD ET AL  2,202,583
RADIO DIRECTION FINDER
Filed July 1, 1938  3 Sheets-Sheet 2

INVENTORS
WILLIAM P. HILLIARD
BY REED R. BRUNNER
F. Bascom Smith
ATTORNEY

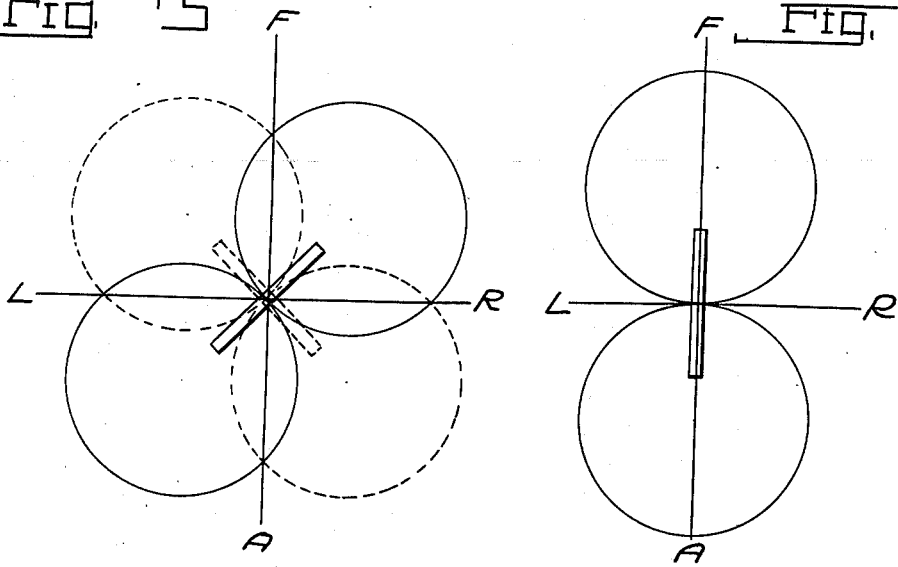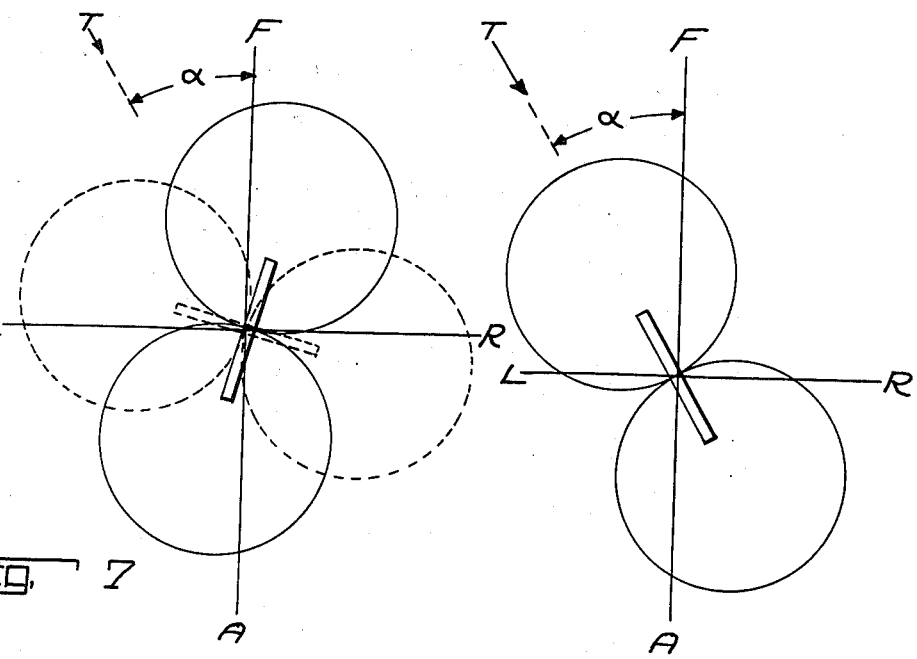

Patented May 28, 1940

2,202,583

UNITED STATES PATENT OFFICE 2,202,583

RADIO DIRECTION FINDER

William P. Hilliard, Washington, D. C., and Reed R. Brunner, Chicago, Ill., assignors to Bendix Radio Corporation, Chicago, Ill., a corporation of Delaware Application July 1, 1938, Serial No. 217,036

9 Claims. (Cl. 250—11)

This invention relates to radio direction finding and deals with a method and apparatus for determining the direction of a radio transmitting source.

An object of the invention is to provide an accurate method for determining the direction of propagation of radio waves in space. A further object is to provide method and apparatus which will clearly indicate the direction of wave propagation without the necessity of calculation or involved mental operations. It is desired that the result obtained by the improved method and apparatus be, so far as is needed, free from directional ambiguity; for example, if a radio wave is approaching from due north, it is desired that the directional indication show at least that the wave is approaching either from due north or due south.

Another object of the invention is to devise a method and apparatus which will give the directional indication while using but a simple single antenna and without manipulation of the phase angle of the received radio energy. A further object is to provide apparatus which is simple in construction and not subject to failure or breakdown.

A more specific object is to provide method and apparatus by which the antenna is adjusted not to the null position in which no radio energy is received but to some other position indicative of the direction of the approaching wave in which position energy is being received from the antenna.

Another specific object is to provide means for mechanically connecting and disconnecting the energy path from the antenna to a signal device so that energy can be delivered to the signal device alternately from different antenna positions.

Still another object is to provide apparatus which can be operated at a remote point and which will give the directional indication at the remote point. Other objects will appear as the specification proceeds.

An embodiment of the improved apparatus employed is illustrated in the accompanying drawings in which:

Figure 5 is a diagram indicating the field pattern of the antenna in each of two positions at neutral adjustment of the apparatus;

Figure 6 is a diagram indicating the field pattern of the antenna in a third position at neutral adjustment of the apparatus;

Figure 7 is a diagram indicating the field pattern of the antenna in each of two positions after the apparatus has been adjusted in accordance with radio energy received from a particular direction; and Figure 8 is a diagram indicating the field pattern of the antenna in a third position after the apparatus has been adjusted as stated in connection with Figure 7.

Figure 1:
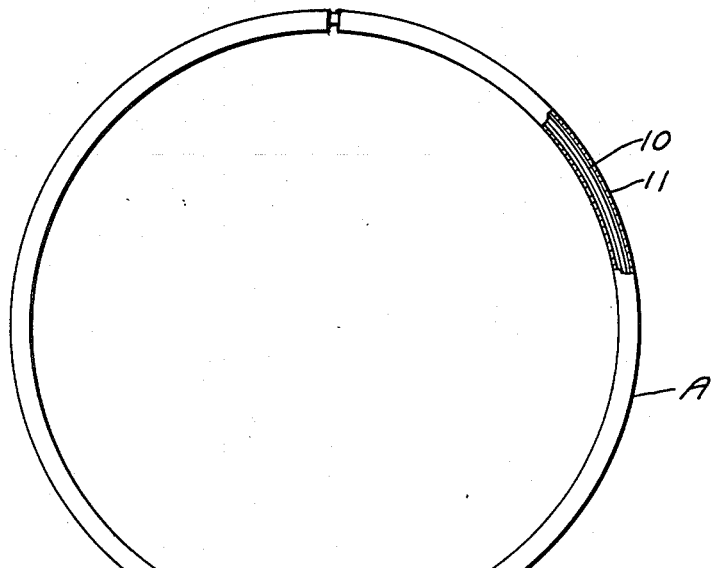
Figure 1 is an elevational view showing the antenna and accompanying mechanism.

As illustrated, A designates an antenna; B, a switching device for passing energy only at desired positions of the antenna; C, a device for indicating the relative strength of radio energy received at different antenna positions; and D, another device for indicating the strength of radio energy received at still a different position of the antenna.

As here shown, the antenna A is of the loop type consisting of turns of conductor wire 10 encased in a shield 11. Secured to the lower side of this shield or casing 11 is a supporting flange 12 which is attached to the end of the drive shaft 13. The drive shaft is rotatably mounted in any suitable manner in a frame or supporting structure 14. As illustrated, frame 14 includes a horizontally disposed plate 15 through which shaft 13 is received. Secured to the top of plate 15 is a U-shaped frame piece 16, and adjacent the inner side of one leg of this piece is mounted on plate 15 a pair of brushes 17 which make sliding contact with a pair of rings 18 secured to shaft 13 and connected respectively to the two ends of the antenna wire 10.

To the under side of plate 15 are secured the mounting posts 19 which carry the frame of motor 20. Any suitable type of motor may be used for actuating the shaft 13; a small electric motor has been found to be very satisfactory.

A bearing piece 21 is secured to the under side of the frame piece 16 and receives the shaft 13 therethrough. A complementary bearing piece 22 is rotatably carried by piece 21, and secured to piece 22 is the worm gear 23. A switch plate 24 is fixedly attached on the under side of gear 23 by means such as the posts 25. Below plate 24 is a generally circular disk 26 which is fixedly secured to the shaft 13 in any suitable way. As shown more clearly in Figure 3, this disk is provided with slight recesses 27 and 28 at diametrically opposite positions. The shaft 13 may be connected in any suitable way with the drive shaft of motor 20, or may be integral with the motor shaft if so desired.

On the under side of plate 24 are mounted the three pairs of contacts 30, 40 and 50. Contact pair 30 comprises the spring fingers 31 and 32 which are secured to the contact post 33. In the type of contact structure shown, a rigid arm 35 is also secured to the post 33 and serves to support the inner finger 32. The outer spring finger 31 is provided at its extended end with a nose 36 which resiliently engages the periphery of the disk 26. Normally, engagement of nose 36 with disk 26 maintains the contacts apart so that electrical connection is not made, but when the disk is turned so that nose 36 comes into register with one of recesses 27 or 28, the contacts become engaged and electrical connection is completed through the contact pair.

The contact pair 40 is constructed similar to pair 30 already described but is so positioned that its nose 46 will be in register with one of recesses 27 or 28 at a different angular position of disk 26. Preferably the noses 36 and 46 of the respective contact structures are positioned 90 degrees apart, so that the connection through contact pairs 30 and 40 are completed at alternate quadrant positions of disk 26.

Figure 3:
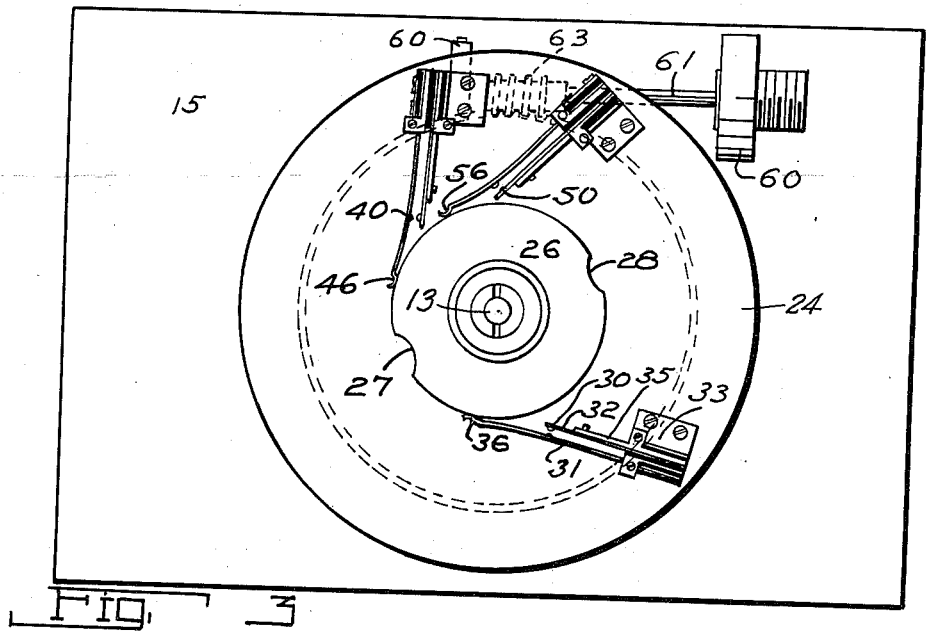
Figure 3 is a plan sectional view of the mechanism shown in Figure 1, the view being taken as indicated at line 3—3 of Figure 1.

The third contact pair 50 is similar also to contact pair 30, but is so positioned that its nose 56 engages the disk 26 at such a point on its periphery as to register with one of recesses 27 or 28 at still a different angular position of disk 26. Preferably the arrangement is such as to cause engagement of nose 56 with one of recesses 27 or 28 at a position of disk 26 which is 45 degrees removed from either position in which contacts 30 or 40 are engaged. As illustrated in Figure 3, the displacement between noses 36 and 46 is 90 degrees, and the displacement between noses 46 and 56 is 45 degrees. It is understood that other suitable switching means for completing an electrical connection at the desired angular positions may be substituted for that herein described.

Figure 2:
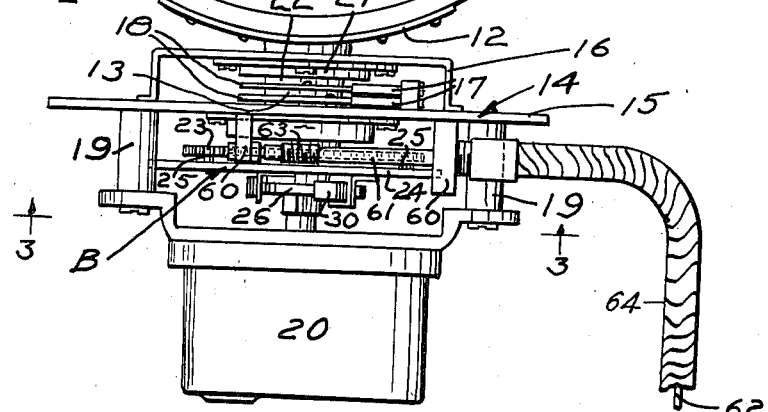
Figure 2 is a plan view of the remote control apparatus.
Figure 2:
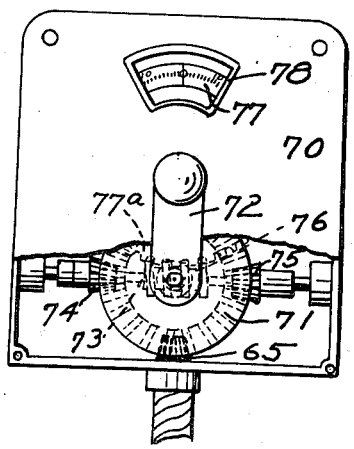

Carried on the under side of plate 15 (Fig. 1) are the bearing posts 60 between which is carried the shaft 61 which is driven by the flexible shaft 62. On shaft 61 is carried a worm 63 which is in engagement with the teeth of the worm gear 23. The flexible shaft 62 extends through the covering 64 to the remote control box 70 which is shown more clearly in Figure 2. At box 70 the shaft 62 is provided with a pinion 65 which engages the gear 71. The shaft of gear 71 extends forwardly to the front of the box and has attached thereto the crank 72.

A shaft 73 extends transversely of box 70 and is provided with the pinions 74 and 75, one of which is rotatable on the shaft. These pinions enage the gear 71 and the shaft is driven thereby. At its central portion shaft 73 has a worm 76 which engages the gear 77a also mounted within box 70. Secured for rotation with gear 77a is the dial 77 which is visible through the front opening 78. Preferably dial 77 is calibrated in degrees each way from a certain base position of the switching mechanism.

Figure 4:
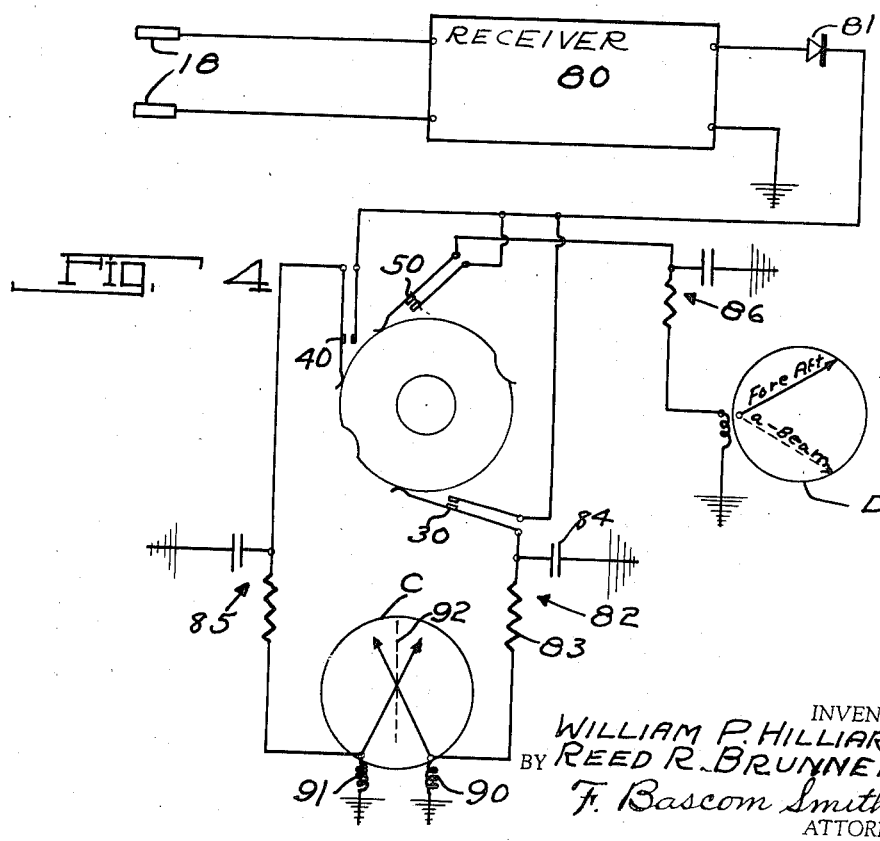
Figure 4 is a schematic view showing the electrical circuit arrangement.

Referring now more particularly to Figure 4 of the drawings, the brushes 18 are connected to the input side of a receiver 80 which preferably includes a beat oscillator, and which may be the usual type of receiver ordinarily used in aircraft. The energy received from the antenna is amplified in the receiver and delivered at the output side in the form of alternating current. One side of the receiver output circuit is connected through the rectifier 81 to one side of each of contact pairs 30, 40 and 50. The rectifier 81 may be of any suitable type such as the copperoxide type.

The other side of contact pair 30 is connected through a filtering device 82 to winding 90 of the cross-pointer indicating instrument C. The filtering device 82 consists of a series resistor 83, and a capacitor 84 connected in shunt to ground. The other side of contact pair 40 is connected through a filtering device 85 similar to device 82 to the other winding 91 of the cross-pointer instrument C. The other side of contact pair 50 is connected through filtering device 86 to the winding of the instrument D. As shown in Figure 4, one side of the receiver 80 is grounded as well as the other ends of the windings or actuating elements of instruments C and D.

While the embodiment described the instrument C is a cross-pointer indicator, this may be any type of signaling device which will give indication of the relative energy delivered at its two connections. If desired, this device may be adapted to give an aural indication of this relation instead of the visual indication given by the cross-pointer instrument shown. The device D may be a meter or any other suitable means for giving an indication as to whether or not energy is being delivered at its terminals. If desired, instruments C and D may be combined in a single case.

The improved apparatus has a particular application for determining the course of an airplane or for determining the course of a ship at sea, and its operation will be described in connection with such situations.

The frame 14 of the apparatus may be secured to the plane or vessel at any suitable location. The shaft 13, which is the axis of rotation of the loop antenna, should be in upright or vertical position so that the loop will rotate about a substantially vertical axis. It is not essential that the loop antenna extend upwardly as is shown in the drawings, but the frame may be so mounted that the loop projects downwardly if so desired. The control box 70 will probably be located in the pilot's compartment or at least in some place convenient for operation. Instruments C and D should be located in close proximity to control box 70, and may, in fact, be combined with box 70 as a single unit, if so desired.

The angular position of the loop with respect to axes of the ship is dealt with more particularly in Figures 5 to 8 of the drawings. In these figures, the vertical axis shown is to represent the fore-aft axis of the ship, and the horizontal axis shown is to represent the transverse or abeam axis of the ship. Figures 5 and 7 show the loop in each of two angular positions with circular lines indicating the directional pattern in each of the two positions, and Figures 6 and 8 show a third position of the loop antenna with the corresponding field pattern.

When the operator wishes to take bearings, he first will make appropriate electrical connections for energizing the motor 20, and operation of motor 20 causes the loop antenna to be constantly rotated at some suitable speed. We have found that satisfactory results may be obtained when the loop is rotated at about 500 R. P. M., though this speed may be varied as may be desired.

Assuming that the apparatus is in neutral position with the dial 77 indicating zero deviation from the fore-aft axis of the ship, when the loop comes to the position indicated in solid lines in Figure 5 of the drawings, the disk 26 will have rotated to bring recess 27 into registry with the nose 36 of contact pair 30. This operates to complete a circuit from the output of the receiver 80 through rectifier 81, contact pair 30, filter 82, and the winding 90 of cross-pointer indicator C to ground. With the antenna in this position it will have greater sensitivity to radio waves approaching in its own plane and will have substantially zero sensitivity to radio waves approaching in a transverse plane. It will, however, be sensitive to waves approaching from directly fore or aft or from right or left of the ship, and the energy collected while the antenna is in this position is transmitted through receiver 80, and contacts 30, and is applied to the one side of the cross-pointer indicator. Since the loop antenna is rotating, such position will be maintained only instantaneously, and when recess 27 moves out of register with nose 36, this path of transmission will be broken until the loop is rotated through 180° to reach the same angular position again at which time the recess 28 will be in register with nose 36 and the transmitting path will be again established.

Upon rotation of the loop 90 degrees from the position first mentioned above, the position indicated in dotted lines in Figure 5 is reached. At this new position the recess 27 is brought into register with the nose 46 of contacts 40 and the circuit from receiver 80 to the winding 91 of instrument C is completed. The antenna in this new position is more sensitive to waves approaching in its new plane and is equally sensitive to waves approaching from directly fore or aft or from right or left as it was in its former position. Thus if the transmitting source is directly forward of the ship, equal energy will be delivered in alternate pulses to each side of the cross-pointer instrument C, and this instrument will have its pointers crossed on the median line 92. The rapid making and breaking of the transmitting circuit has been found to create unwanted transient effects in the energy delivered to the instrument C, and the purpose of the filters 82, 85 and 86 is to carry off disturbing transients and smooth the flow of energy to the respective instrument connections.

From the above it will be clear that with neutral position of crank 72, when the pointers of instrument C are crossed on the median line, this is an indication that the radio energy is being received from a direction which is directly fore, aft, right or left of the ship. The third pair of contacts 50 are adapted to make engagement when the nose 56 registers with either of recesses 27 or 28, and under normal adjustment this may take place, preferably, as illustrated in Figure 6, when the antenna is aligned with the fore-aft axis of the ship. If the radio energy is being propagated in a direction parallel with the fore-aft axis of the ship, a substantial amount of energy will be delivered through contacts 50 to the meter D, but if the radio energy is being propagated in a direction parallel with the abeam axis of the ship, substantially no energy will be received for delivery to instrument D. The indication given in this way conveys information as to which two of the four quadrants may contain the direction of the wave source.

Where the transmitting source of the radio waves is from some unknown direction not aligned with the fore-aft axis of the ship, it will be found that the instrument will not indicate equal energy being delivered to its two sides, and in such case, the operator may turn the crank 72 until such indication is given. The turning of crank 72 causes rotation of the flexible shaft 62 which, at the location of the antenna, causes rotation of the worm 63. Rotation of worm 63 produces angular movement of the gear 23 which carries along with it the switch plate 24 upon which the contacts 30, 40 and 50 are mounted. Such movement changes the angular position of disk 24, and the receiving positions of the antenna also, with respect to the frame 14 or the ship's axes. The antenna positions at which transmission connections are completed are described by Figure 7 of the drawings where the switch plate has been moved through α degrees.

Turning the crank 72 also operates to rotate dial 77, and as the dial is preferably calibrated in the number of degrees to which the switching mechanism has been moved, this means gives a direct reading of the direction of the transmitting source with respect to the ship's axes. When crank 72 has been turned until the instrument C indicates equal energy being delivered to it in each sense, this gives information that the radio energy is being received from direction T (Figure 7) or from directions 90 or 180 degrees removed from this direction. After this adjustment, the reading of the instrument D may be noted and if a substantial reading is given, it is known that the wave source is in the direction T or the opposite direction. If, on the other hand there is no substantial reading on instrument D, it is known that the wave source is in a direction 90 degrees removed from T, or α degrees removed from the abeam axis of the ship. Or, if the operator so desires, he may continue to turn crank 72 until a position is reached in which not only are the pointers of instrument C crossed on the median line, but the instrument D gives a positive reading, and with such adjustment, the operator knows that the angle read on dial 77 is the angle between the direction of wave propagation and the fore-aft axis of the ship.

The above described modes of operation contemplate the rotation of the antenna positions at which energy is being received, the extent of such rotation being an indication of the direction in which the radio energy is being propagated. The device may also be used independently of the rotation of antenna positions just referred to, to provide a direct reading instrument.

As before stated, without adjustment of the setting at dial 77, the indicating meter C will give zero deflection in response to radio energy propagated in a fore-aft direction. When the radio wave is approached from a direction to the right or left of a fore-aft direction, the needle intersection point will be deflected respectively to right or left of the neutral position. The extent of this deflection will be a measure of the angle which the direction of wave propagation makes with the fore-aft axis of the ship. Thus, the indicated instrument may be calibrated to indicate the direction of radio propagation with respect to the ship or other structure on which the device is mounted. When used as above described, the improved device serves as a direct reading instrument, giving, without adjustment, the bearings of a ship with respect to a transmitting station of known position.

While we have specifically described but a single embodiment of the invention, it is obvious that other embodiments may be constructed and that many changes may be made in the construction of the apparatus without departing from the spirit of the invention. While the operation of the apparatus and the procedure followed in carrying out the improved method has been set forth in connection with obtaining bearings of a moving aircraft, it is clear that the improved method and apparatus may also be applied in other situations.

The foregoing description has been given for clearness of understanding only, and no unnecessary limitations should be understood therefrom, but the appended claims should be construed as broadly as permissible, in view of the prior art.

What is claimed is:

1. A radio direction finder comprising a rotatable antenna, means for receiving radio energy alternately at each of two angularly related antenna positions, means for receiving radio energy at a third antenna position angularly related to each of said positions, a ratio indicating device, means responsive to radio energy received at one of said two positions for impressing stimuli on said device, means responsive to radio energy received at the other of said two positions for impressing stimuli on said device, said device being responsive to each of said stimuli in different sense so as to give indication comparative of their strength, a second indicator device, and means responsive to radio energy received at said third position for impressing stimuli on said second device.

2. A radio direction finder comprising an antenna having directional characteristics, a motor for continuously rotating said antenna, a ratio indicating device, means responsive to radio energy received on said antenna at one angular position for impressing stimuli on said device, means responsive to radio energy received on said antenna at another angular position for impressing other stimuli on said device, said device being responsive to each of said stimuli in different sense so as to give comparative indication of their strength, a second indicator device, means responsive to radio energy received on said antenna at a third angular position for impressing stimuli on said second device, and means for angularly changing said positions of said antenna at which said means are responsive to received radio energy.

3. A radio direction finder comprising a loop antenna, power means for continuously rotating said antenna, a ratio indicating device, means for transmitting energy received on said antenna to said device, said transmitting means including a switch driven in unison with said antenna by said power means, said switch having one pair of contacts engaged only when said antenna is in one angular position whereby energy is passed toward said device, said switch having a second pair of contacts engaged only when said antenna is in a second position substantially at right angles to said one position whereby energy is passed toward said device, said device being responsive to energy passed through each of said pairs of contacts in different sense so as to give comparative indication of the strength of the energy so passed, a second indicator means, and a third pair of contacts on said switch for passing energy to said second indicator means, said third pair of contacts being engaged so as to pass energy therethrough only when said antenna is in a third angular position.

4. A radio direction finder comprising a frame, a shaft rotatably mounted in said frame, a loop antenna secured to said shaft, power means for continuously rotating said shaft, a ratio indicating device, means for transmitting energy received on said antenna to said device, said transmitting means including a switch having its stator movably mounted in said frame and having its rotor driven by said shaft, said switch having one pair of contacts engaged only when said antenna is substantially in one plane whereby energy is passed to said device, said switch having a second pair of contacts engaged only when said antenna is substantially in a second plane whereby energy is passed to said device, said device being responsive to energy passed through each of said pairs of contacts in different sense so as to give comparative indication of the strength of the energy so passed, and means for moving the stator of said switch with respect to said frame so as to change the positions of said antenna at which energy is passed through said pairs of contacts.

5. A radio direction finder comprising a loop antenna, power means for continuously rotating said antenna, a ratio indicating device and means for transmitting energy received on said antenna to said device, said transmitting means including a radio amplifying device and a rectifier, said transmitting means including also a rotary switch having its rotor member driven by said power means in unison with said antenna, said switch having one pair of contacts engaged when said antenna is substantially in one plane whereby an electric current is passed toward said ratio indicating device, said switch having a second pair of contacts engaged when said antenna is substantially in a second plane angularly related to said first-mentioned plane whereby an electric current is passed toward said ratio indicating device, said ratio indicating device being responsive to current passed through each of said pairs of contacts in different sense so as to give comparative indication of the strength of the currents so passed.

6. Apparatus as set forth in claim 5 including filtering means connected in series with said rectifier and said signal device for smoothing out the flow of direct current to said device.

7. In a radio direction finder, a directional antenna, power means constantly rotating said antenna, a receiver connected to said antenna, an output circuit connected to said receiver and including a rectifier, an indicator, means periodically connecting said indicator with said output circuit upon a predetermined angular position of said antenna, a ratio indicator, and means connecting said ratio indicator with said output circuit upon other successive angular positions of said antenna, whereby the ratio between the output energies of said antenna at said successive angular positions may be determined.

8. In a radio direction finder, a rotating loop antenna, power means for rotating said antenna, a receiver comprising an amplifier and detector connected to said antenna, an output circuit connected to said receiver, a rectifier in said output circuit, a cross pointer indicating instrument having an energizing winding for each pointer, periodic switch means connecting each of said windings to said output circuit in timed relation with respect to the rotation of said antenna, a second indicator, and means including said switch means for periodically connecting said second indicator to said output circuit.

9. In a radio direction finder, a rotating loop antenna, power means for rotating said antenna, a receiver comprising an amplifier and detector connected to said antenna, an output circuit connected to said receiver, a rectifier in said output circuit, a cross pointer indicating instrument having an energizing winding for each pointer, a rotatable cam member actuated by said antenna rotating means, means for adjusting the angular relation of said cam member with respect to said antenna rotating means, switch means operated by said cam member to periodically connect each of said windings to said output circuit, a second indicator, and separate switch means operated by said cam member for periodically connecting said second indicator to said output circuit.

WILLIAM P. HILLIARD.
REED R. BRUNNER.